United States Patent
Das et al.

(10) Patent No.: US 8,824,602 B2
(45) Date of Patent: Sep. 2, 2014

(54) METHOD OF EQUALIZING AN OFDM SIGNAL

(71) Applicant: University of Vienna, Vienna (AT)

(72) Inventors: Saptarshi Das, Bangalore (IN); Tomasz Hrycak, Vienna (AT)

(73) Assignee: University of Vienna, Vienna (AT)

(*) Notice: Subject to any disclaimer, the term of this patent is extended or adjusted under 35 U.S.C. 154(b) by 0 days.

(21) Appl. No.: 13/738,591

(22) Filed: Jan. 10, 2013

(65) Prior Publication Data

US 2013/0182754 A1 Jul. 18, 2013

(30) Foreign Application Priority Data

Jan. 10, 2012 (EP) ..................................... 12150683

(51) Int. Cl.
*H04L 27/06* (2006.01)
*H04L 25/03* (2006.01)
*H04L 27/26* (2006.01)

(52) U.S. Cl.
CPC .... *H04L 25/03885* (2013.01); *H04L 25/03006* (2013.01); *H04L 27/2647* (2013.01)
USPC .......................................................... 375/340

(58) Field of Classification Search
CPC ....... H04L 1/0045; H04L 1/20; H04L 25/067; H04L 25/03038; H04L 25/03057
See application file for complete search history.

(56) References Cited

U.S. PATENT DOCUMENTS

| | | | |
|---|---|---|---|
| 2010/0008433 A1* | 1/2010 | Huang et al. | 375/260 |
| 2013/0163700 A1* | 6/2013 | Toufik et al. | 375/340 |

FOREIGN PATENT DOCUMENTS

EP 2 228 955 A1 9/2010

OTHER PUBLICATIONS

Han Zhang, et al., *Optimal Channel Estimation of MIMO/OFDM Systems in Time-varying Wireless Channels*, IEEE, 2008, pp. 288-291.
European Search Report for Application No. 10450035.0-1525, dated Aug. 12, 2010, 5 pages.
Sinem Coleri, et al., *Channel Estimation Techniques Based on Pilot Arrangement in OFDM Systems*, IEEE Transactions on Broadcasting. vol. 48, No. 3, Sep. 2002, 223-229.
Zijian Tang, et al., *Pilot Schemes for Time-Varying Channel Estimation in OFDM Systems*, IEEE, 2007, 5 pages.

(Continued)

*Primary Examiner* — Leon-Viet Nguyen
(74) *Attorney, Agent, or Firm* — Stein IP, LLC

(57) ABSTRACT

A method of equalizing an OFDM signal received over a transmission channel defined by a channel matrix includes:
windowing the received signal in the time domain with at least two different tapers to obtain at least two tapered received signals;
stacking the tapered received signals in the form of a joint matrix equation $$\begin{bmatrix} y_1 \\ \vdots \\ y_\gamma \\ \vdots \\ y_\Gamma \end{bmatrix} = \begin{bmatrix} D_1 \\ \vdots \\ D_\gamma \\ \vdots \\ D_\Gamma \end{bmatrix} y = \begin{bmatrix} D_1 \\ \vdots \\ D_\gamma \\ \vdots \\ D_\Gamma \end{bmatrix} (Hx + \Phi)$$

with
y being the received signal,
$\Gamma$ being the number of tapers,
$D_\gamma$ being the γth taper in form of a diagonal matrix,
$y_\gamma$ being the γth tapered received signal,
H being the channel matrix,
x being the time domain transmitted signal,
$\varphi$ being optional noise; and
solving said joint matrix equation for x as a least squares problem.

24 Claims, 2 Drawing Sheets (56) References Cited

OTHER PUBLICATIONS

Thomas Zemen, et al., *Time-Variant Channel Equalization via Discrete Prolate Spheroidal Sequences*, IEEE, 2003, pp. 1288-1292.
Arun P. Kannu, et al., *Design and Analysis of MMSE Pilot-Aided Cyclic-Prefixed Block Transmissions for Doubly Selective Channels*, IEEE Transactions on Signal Processing, vol. 56, No. 3, Mar. 2008, pp. 1148-1160.
David Gottlieb, et al., *On the Gibbs Phenomenon and Its Resolution*, Society for Industrial and Applied Mathematics Review, vol. 39, No. 4, Dec. 1997, pp. 644-668.
Tobin A. Driscoll, et al., *A Padé-based algorithm for overcoming the Gibbs phenomenon*, Numerical Algorithms, vol. 26, 2001, pp. 77-92.
Neal C. Gallagher, et al., *A Novel Approach for the Computation of Legendre Polynomial Expansions*, IEEE Transactions on Acoustics, Speech, and Signal Processing, vol. ASSP-26, No. 1, Feb. 1978, pp. 105-106.
Bernie D. Shizgal, et al., *Towards the resolution of the Gibbs phenomena*, Journal of Computational and Applied Mathematics 161, Apr. 14, 2003, pp. 41-65.
M. Abramowitz, et al., *Handbook of Mathematical Functions with Formulas, Graphs, and Mathematical Tables*, Dec. 1972, 11 pages.
Imad Barhumi, et al., *Time-Varying FIR Equalization for Doubly Selective Channels*, IEEE Transactions on Wireless Communications, vol. 4, No. 1, Jan. 2005, pp. 202-214.
Imad Barhumi, et al., *MLSE and MAP Equalization for Transmission Over Doubly Selective Channels*, IEEE Transactions on Vehicular Technology, vol. 58, No. 8, Oct. 2009, pp. 4120-4128.
Patrick Robertson, et al., *The Effects of Doppler Spreads in OFDM (A) Mobile Radio Systems*, 1999, pp. 329-333.
Ye (Geoffrey) Li, et al., *Bounds on the Interference of OFDM in Time-Varying Impairments*, IEEE Transactions on Communications, vol. 49, No. 3, Mar. 2001, pp. 401-404.
Mark Russell, et al., *Interchannel Interference Analysis of OFDM in a Mobile Enviornment*, IEEE, 1995, pp. 820-824.
Yang-Seok Choi, et al., *On Channel Estimation and Detection for Multicarrier Signals in Fast and Selective Rayleigh Fading Channels*, IEEE Transactions on Communications, vol. 49, No. 8, Aug. 2001, pp. 1375-1387.
Xiadong Cai, et al., *Bounding Performance and Suppressing Intercarrier Interference in Wireless Mobile OFDM*, IEEE Transactions on Communications, vol. 51, No. 12, Dec. 2003, pp. 2047-2056.
Alexei Gorokhov, et al., *Robust OFDM Receivers for Dispersive Time-Varying Channels: Equalization and channel Acquisition*, IEEE Transactions on Communications, vol. 52, No. 4, Apr. 2004, pp. 572-583.
Luca Rugini, et al., *Simple Equalization of Time-Varying Channels for OFDM*, IEEE Communications Letters, vol. 9, No. 7, Jul. 2005, pp. 619-621.
Georg Taubӧck, et al., *LSQR-Based Equalization for Multicarrier Communications in Strongly Dispersive and Highly Mobile Environments*, IEEE, 2007, 5 pages.
Youcef Saad, et al., *GMRES: A Generalized Minimal Residual Algorithm for Solving Nonsymmetric Linear Systems*, Society for Industrial and Applied Mathematics (SIAM) J. Sci. Stat. Comput., vol. 7, No. 3, Jul. 1996, pp. 856-869.
Christopher C. Paige, et al., *LSQR: An Algorithm for Sparse Linear Equations and Sparse Least Squares*, ACM Transactions on Mathematical Software, vol. 8, No. 1, Mar. 1982, pp. 43-71.
Arnold Neumaier, *Solving Ill-Conditioned and Singular Linear Systems: A Tutorial on Regularization*, Society for Industrial and Applied Mathematics (SIAM) Rev., vol. 40, No. 3, Sep. 1998, pp. 636-666.
Michael K. Tsatsanis et al., *Modelling and Equalization of Rapidly Fading Channels*, International Journal of Adaptive Control and Signal Processing, vol. 10, 159-176, 1996, pp. 159-176.
Georgios B. Giannakis, et al., *Basis Expansion Models and Diversity Techniques for Blind Identification and Equalization of Time-Varying Channels*, Proceedings of the IEEE, vol. 86, No. 10, 1998, pp. 1969-1986.
William C. Jakes, Multipath Interferences, Chapter 1 in William C. Jakes, ed, *Microwave Mobile Communications*, IEEE, Inc., 1974, title, table of contents, and pp. 11-78.
Åke Björck, *Numerical Methods for Least Squares Problems*, Society for Industrial and Applied Mathematics, 1996, title pages and pp. 303-311 and 334-335.
European Search Report for Application No. 10450034.3-1525, dated Aug. 12, 2010, 5 pages.
Eitan Tadmor, *Filters, mollifiers, and the computation of the Gibbs phenomenon*, Acta Numerica, 2007, pp. 305-379.
John P. Boyd, *Chebyshev and Fourier Spectral Methods*, Second Edition, 2000, 611 pages.
I.S. Gradshteyn, et al., *Table of Integrals, Series and Products*, Elsevier, Seventh Edition, 2007, 1221 pages.
Gene H. Golub, et al., *Matrix Computations: Third Edition*, 1996, 169 pages.
U.S. Appl. No. 13/582,509, filed Sep. 4, 2012, Tomasz Hrycak, et al., 1) Universitaet Wien 2) Technische Universitaet Wien.
U.S. Appl. No. 13/582,515, filed Sep. 4, 2012, Tomasz Hrycak, et al., 1) Universitaet Wien 2) Technische Universitaet Wien.
Thomas Zemen, et al., *Time-Variant Channel Estimation Using Discrete Prolate Spheroidal Sequences*, IEEE Transactions on Signal Processing, vol. 53, No. 9, Sep. 2005, pp. 3597-3607
T. Zemen, et al., *Time Variant Channel Equalization for MC-CDMA via Fourier Basis Functions*, MC-SS Workshop 2003, Oberpaffenhofen, Germany, 2003, pp. 451-458 (reprinted unpaged).
David J. Thomson, *Spectrum Estimation and Harmonic Analysis*, Proceedings of the IEEE, vol. 70, No. 9, Sep. 1982, pp. 1055-1096.
Zijian Tang, et al., *Pilot-Assisted Time-Varying Channel Estimation for OFDM Systems*, IEEE Transactions on Signal Processing, vol. 55, No. 5, May 2007, pp. 2226-2238.
Changyong Shin, et al., *An Efficient Design of Doubly Selective Channel Estimation for OFDM Systems*, IEEE Transactions on Wireless Communications, vol. 6, No. 10, Oct. 2007, pp. 3790-3802
Philip Schniter, *Low-Complexity Equalization of OFDM in Doubly Selective Channels*, IEEE Transactions on, vol. 52, No. 4, Apr. 2004, pp. 1002-1011, also published as IEEE Transactions on Acoustics, Speech, and Signal Processing.
Luca Rugini, et al., *Low-Complexity Banded Equalizers for OFDM Systems in Doppler Spread Channels*, EURASIP Journal on Applied Signal Processing, vol. 2006, pp. 1-13 (Article ID 67404).
Chi-Min Li, et al., *Performance Analysis of Different HSDPA Equalizers Under the Measured Outdoor Channels*, Proceedings of 2007 International Symposium on Intelligent Signal Processing and Communication Systems, IEEE, 2007, pp. 794-797.
Geert Leus, *On the Estimation of Rapidly Varying Channels*, Proc. of the European Signal Processing Conference (EUSIPCO 2004), vol. 4, Sep. 2004, pp. 2227-2230.
Tomasz Hrycak, et al., *Practical Estimation of Rapidly Varying Channels for OFDM Systems*, IEEE Transactions on Communications, vol. 59, No. 11, Nov. 2011, pp. 3040-3048.
Tomasz Hrycak, et al., *Low Complexity Equalization for Doubly Selective Channels Modeled by a Basis Expansion*, IEEE Transactions on Signal Processing, vol. 58, No. 11, Nov. 2010, pp. 5706-5719.
Maxime Guillaud, et al., *Channel Modeling and Associated Inter-Carrier Interference Equalization for OFDM Systems with High Doppler Spread*, Acoustics, Speech, and Signal Processing, 2003. Proceedings (ICASSP'03). 2003 IEEE International Conference on, vol. 4, Apr. 2003, pp. IV-237 through IV-240.
Kun Fang, et al., *Low-Complexity Block Turbo Equalization for OFDM Systems in Time-Varying Channels*, IEEE Transactions on Signal Processing, vol. 56, No. 11, Nov. 2008, pp. 5555-5566.
Hakan A. Cirpan, et al., *Maximum Likelihood Blind Channel Estimation in the Presence of Doppler Shifts*, IEEE Transactions on Signal Processing, vol. 47, No. 6, Jun. 1999, pp. 1559-1569 (also published as IEEE Transactions on Acoustics, Speech and Signal Processing).
Deva K. Borah, et al., *Frequency-Selective Fading Channel Estimation with a Polynomial Time-Varying Channel Model*, IEEE Transactions on Communications, vol. 47, No. 6, Jun. 1999, pp. 862-873.

(56) References Cited

OTHER PUBLICATIONS

John A. C. Bingham, *Multicarrier Modulation for Data Transmission: An Idea Whose Time Has Come*, IEEE Communication Magazine, May 1990, pp. 5-8 and 11-14.

IEEE Computer Society, et al. *Part 16: Air Interface for Fixed and Mobile Broadband Wireless Access Systems. Amendment 2: Physical and Medium Access Control Layers for Combined Fixed and Mobile Operation in Licensed Bands*, Feb. 28, 2006, 864 pages.

I.S. Gradshteyn, et al., *Table of Integrals, Series, and Products*, Seventh Edition, 2007, pp. 1-125.

\* cited by examiner

METHOD OF EQUALIZING AN OFDM SIGNAL

CROSS-REFERENCE TO RELATED APPLICATIONS

This application claims the benefit of European Patent Application No. EP12150683 filed Jan. 10, 2012, in the European Patent Office, the disclosure of which is incorporated herein by reference.

BACKGROUND OF THE INVENTION

Field of the Invention

The present invention relates to a method of equalizing an OFDM signal received over a transmission channel defined by a channel matrix.

Orthogonal frequency division multiplexing (OFDM) [1, hereinafter, reference numbers, below, in brackets] has several advantages, e.g. high spectral efficiency, fast FFT based modulation, and robustness against multipath propagation. OFDM was initially designed for communication over time invariant i.e. frequency selective channels. Intersymbol interference (ISI) due to the multipath effect is easily mitigated using a cyclic-prefix (CP) based transmission. Moreover, for time invariant channels the frequency domain channel matrix is diagonal. Therefore, with K OFDM sub-carriers, channel demodulation, estimation, and equalization are accomplished in O (K log K) operations.

Contemporary OFDM based applications like Mobile WiMAX (IEEE 802.16e), WAVE (IEEE 802.11p), and DVB-T (ETSI EN 300 744), are expected to operate over a rapidly time varying (TV) doubly selective channels. Apart from being frequency selective due to multipath effect, such channels are also time selective due to the Doppler effect caused e.g. by receiver mobility. The time selective nature of the wireless channel causes inter-carrier interference (ICI) in multicarrier communication systems like OFDM, which has to be mitigated during equalization. Apart from the Doppler effect, the carrier frequency offset at the receiver also contributes to ICI. The Doppler effect is amplified by three factors: the receiver velocity, the carrier frequency, and the reciprocal of the inter-carrier frequency spacing. Upcoming wireless communication systems assume increases of these three factors, and, consequently, stronger Doppler effects. A robust, low complexity method for equalization at low SNRs would be desirable to reduce power usage, and make the communication systems more energy efficient.

Typical low complexity OFDM equalizers for doubly selective channels rely on an approximation of the frequency domain channel matrix by a banded matrix, in combination with windowing of the receive signal. The purpose of windowing is to limit inter-carrier interference to neighboring sub-carriers, and thus concentrate the frequency domain channel matrix around the diagonal. However, the windows proposed for this task decay rapidly at the boundaries of the OFDM symbol, and thus some information is lost from the received signal during windowing.

Figure 1:
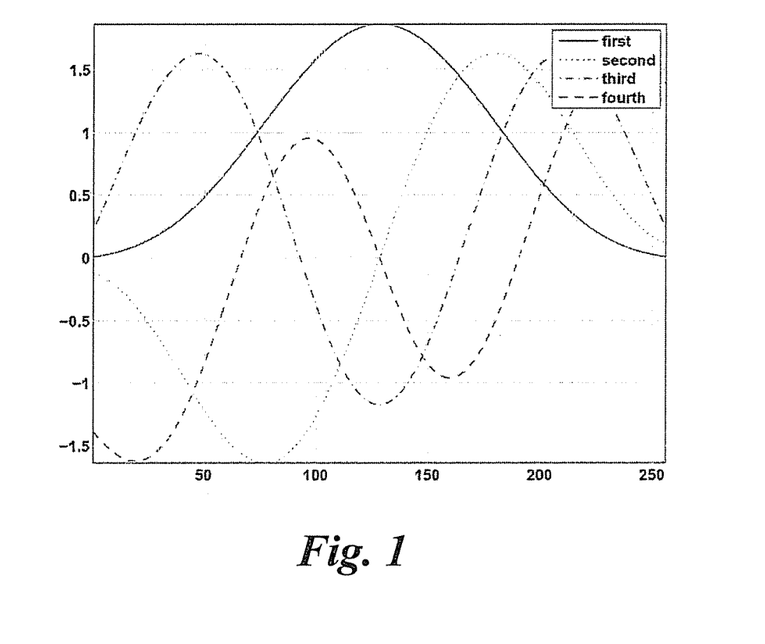
FIG. 1 shows four orthogonal tapers computed for a Doppler shift of 15% of the inter-carrier frequency spacing, and for a 5 diagonal frequency domain channel matrix approximation.
Figure 2:
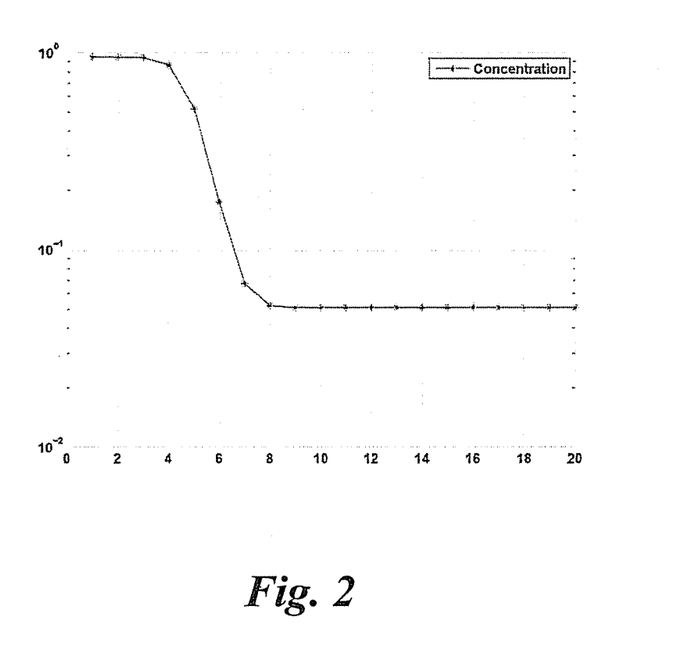
FIG. 2 shows the first 20 eigenvectors computed for a Doppler shift of 15% of the inter-carrier frequency spacing for an approximate frequency domain channel matrix of bandwidth 5.

In EP 2 228 955 A1 it has been proposed to use a set of different tapers (windows) for the received signal in the time domain to minimize information loss caused by windowing. Reference is made to FIG. 1 showing the principle of the "multi-taper" OFDM equalizing method of EP 2 228 955 A1: In brief, EP 2 228 955 A1 describes an iterative method wherein a weighted average of a matched filter-bank (MFB) output of each of the windowed version of the received signal is considered as partially equalized signal. Subsequently, this partially equalized signal is used in a feedback loop in order to perform ICI cancellation. The method of EP 2 228 955 A1 depends on a feedback iteration, note in FIG. 1 the loop right after block F, and cascaded version of such feedback iterations are e.g. shown in FIGS. 7 and 8 of EP 2 228 955 A1. Such an iterative approach is computational demanding and prone to varying convergence times, making the known method unreliable for practical applications.

It is an object of the invention to devise a robust method for equalizing a received OFDM signal with less computational requirements than the state of the art.

SUMMARY OF THE INVENTION

Additional aspects and/or advantages of the invention will be set forth in part in the description which follows and, in part, will be obvious from the description, or may be learned by practice of the invention.

This and other objects of the invention are achieved with a method of equalizing an OFDM signal received over a transmission channel defined by a channel matrix, comprising:
windowing the received signal in the time domain with at least two different tapers to obtain at least two tapered received signals;
stacking the tapered received signals in the form of a joint matrix equation $$\begin{bmatrix} y_1 \\ \vdots \\ y_\gamma \\ \vdots \\ y_\Gamma \end{bmatrix} = \begin{bmatrix} D_1 \\ \vdots \\ D_\gamma \\ \vdots \\ D_\Gamma \end{bmatrix} y = \begin{bmatrix} D_1 \\ \vdots \\ D_\gamma \\ \vdots \\ D_\Gamma \end{bmatrix}(Hx + \Phi)$$

with
y being the received signal,
$\Gamma$ being the number of tapers,
$D_\gamma$ being the γth taper in form of a diagonal matrix,
$y_\gamma$ being the γth tapered received signal,
H being the channel matrix,
x being the time domain transmitted signal,
$\phi$ being optional noise; and
solving said joint matrix equation for x as a least squares problem.

The invention thus proposes a novel low-complexity equalization method particularly suited for OFDM transmissions over doubly selective channels. The proposed method uses at least two different tapers to window the received signal. Consequently, no part of the receive signal is attenuated in the same way by all the windows, and conditioning of the equalization improves dramatically. The main benefits of the proposed method are as follows:
The method follows a straight-forward ("direct") approach, i.e. does not necessitate iterations in a feedback loop, yielding to a robust, predictable and reliable operation in practical applications;
Multiple orthogonal tapers are applied to the receive signal in order to concentrate the frequency domain channel matrix around the diagonal;
Using multiple tapers instead of a single taper improves conditioning of the equalization;
The method requires only the received signal and an estimation of the channel matrix, e.g. estimated Fourier coefficients of the channel taps such as CE-BEM coefficients;

The computational complexity of the method of the invention is of the order O(K log K), and the memory requirement of the order O(K), where K is the number of OFDM subcarriers.

In a preferred embodiment of the invention said joint matrix equation is solved by solving the least squares problem $$\underset{x}{\operatorname{argmin}}\{\|Dy - DHx\|_2^2\}$$

with

D being the rectangular matrix $[D_1, \ldots, D_\gamma, \ldots, D_\Gamma]^T$.

In further preferred embodiments of the invention said joint matrix equation is solved by solving a regularized least squares problem, and in particular by solving a regularized and weighted least squares problem.

The weighting vector $\Lambda$ of the regularized and weighted least squares problem can preferably be computed as $$\Lambda := (\operatorname{diag}(\lambda_1, \ldots, \lambda_1, \lambda_2, \ldots, \lambda_2, \ldots, \lambda_\Gamma, \ldots, \lambda_\Gamma))$$

with $\lambda_\gamma$ being the concentration of the $\gamma$th taper.

In further embodiments of the invention all of said tapers preferably are not zero at the same time, and in particular are mutually orthogonal, to minimize information loss caused by the windowing.

Further variants of the inventive method comprise one or more of the following features:

the tapers are computed from generalized eigenvectors of the generalized eigenvalue problem with the matrices $$(A \circ R) \text{ and } ((\sigma^2 + \Sigma_l \sigma_l^2)I - A \circ R)$$

with

A being the discrete Dirichlet matrix,
R being the autocorrelation matrix of the channel matrix,
$\sigma^2$ being the variance of the channel noise, and
$\sigma_l$ being the power of the lth channel tap;
the least squares method is applied to the equivalent frequency domain form of said joint matrix equation, which takes fewer computations than in the time domain;
said equivalent frequency domain form of said joint matrix equation is solved by solving its corresponding normal equations;
the channel matrix is modeled with a complex-exponential basis expansion model of the channel taps of the transmission channel;
the channel matrix is modeled with a truncated Fourier series expansion model of the channel taps of the transmission channel;
in solving the least squares problem the channel matrix is approximated by a banded matrix;
the least squares problem containing said banded channel matrix approximation is solved by using a Cholesky factorization; and/or
four different tapers are used which is perfectly sufficient if the maximum Doppler frequency shift is less than 40% of the intercarrier frequency spacing.

BRIEF DESCRIPTION OF THE DRAWINGS

These and/or other aspects and advantages of the invention will become apparent and more readily appreciated from the following description of the embodiments, taken in conjunction with the accompanying drawings of which.

The invention will now be described in detail under reference to the enclosed drawings in which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

1. Introduction

The invention is now described in detail as follows. In this Section 1, we give an introduction to the problem and solution presented here. In Section 2, we describe the mathematical model for OFDM transmissions over doubly selective channels. In Section 3, we introduce windowing of the receive signal with multiple orthogonal tapers. In this section, we also present an explicit construction of such windows, and show how multiple windows improve conditioning of the equalization problem. The equalization algorithm with multiple windows is presented in Section 4. The complexity of the proposed algorithms, and the implementation details are also described in this section. In the same section, we also prove that the CE-BEM is the optimal BEM for equalizers that rely on a banded approximation of the frequency domain channel matrix. In Section 5, we compare the proposed equalizer with other low complexity equalizers. The results of numerical simulations are presented in Section 6.

In this application, we consider doubly selective channels which are varying at the scale of one OFDM symbol, and thus in the remainder of this description, we deal with one OFDM symbol duration at a time. We assume that the inter-symbols interference (ISI) is mitigated using a sufficiently long cyclic prefix. For OFDM transmissions over purely frequency-selective channels, single tap estimation and equalization in the frequency domain is a method of choice. Equalization of doubly selective channels can be done in two ways: either using an estimated wireless channel by means of pilots, or in a blind fashion. In this application we consider the first approach.

The most efficient approach to estimate a time-varying doubly-selective wireless channel is through the Basis Expansion Model (BEM), see [2], [3], [4], [5]. Within the framework of the BEM, the channel taps are approximated by linear combinations of prescribed basis functions. Consequently, channel estimation is equivalent to estimation of the basis coefficients of the channel taps. Several bases have been proposed for modeling the channel taps of a doubly-selective channel. The BEM with complex exponentials (CE-BEM) [6], [7] approximates the channel taps by a truncated Fourier series, and results in a banded frequency-domain channel matrix. Unfortunately, accuracy of CEBEM is reduced by the Gibbs phenomenon, see [8], [2]. On the other hand, the CE-BEM allows a fast equalization utilizing the banded frequency domain channel matrix. Several other versions of the BEM have been developed: the generalized CE-BEM (GCE-BEM) [9], the polynomial BEM (P-BEM) [10], [5], and the discrete prolate spheroidal BEM (DPS-BEM) [2]. The papers [3] and [5] are focused on estimation in extreme regimes, when the channel taps noticeably fluctuate within a single OFDM symbol duration. However, for estimating the BEM coefficients of L channel taps, the method proposed in [5] requires $O(L \log L)$ operations and $O(L)$ memory, while the method proposed in [3] requires $O(L^2)$ in operations and $O(L^2)$ memory.

Typically, equalization of the receive signal is done after channel estimation. A method proposed in [11] uses estimated BEM coefficients directly for equalization of the receive signal, without ever creating the channel matrix. In addition, this low complexity method gives BERs equivalent to those obtained with the MMSE equalization. With K OFDM subcarriers, that equalizer has a complexity of $O(K \log K)$, and requires $O(K)$ memory. Other low-complexity equalization methods are proposed in [12], [13]. To achieve low complexity, these methods multiply the received signal by a window in the time domain. The windows make the frequency domain channel matrix more concentrated around the diagonal. Consequently, a banded approximation of the frequency domain channel matrix becomes more accurate. Unfortunately, the proposed windows [12], [13] rapidly decay near the boundaries of the OFDM symbol. Thus multiplying the receive signal by such windows leads to considerable loss of information. From another viewpoint, multiplication by such a window has a large condition number, thereby decreasing the SNR. These problems are overcome in the following way.

2. OFDM Transmissions Over Doubly Selective Channels

In this section, we briefly describe the mathematical model for OFDM transmissions over doubly selective channels. In this application, we are interested in doubly selective channels that vary at the scale of one OFDM symbol. Consequently, we deal with only one OFDM symbol at a time. We consider a single-user CP-OFDM system with K subcarriers and a cyclic prefix of length $L_{cp}$. We denote the transmissions bandwith by B, and the sampling period by $T_s = 1/B$. We assume that $L_{cp} T_s$ exceeds the channel's maximum path delay and, consequently, no inter-symbol interference (ISI) occurs.

The time-domain transmit signal x[n] is obtained by modulating the frequency-domain transmit symbols A[k] (k=0, ..., K−1) using the inverse Discrete Fourier Transform (IDFT) as follows:

$$x[n] = \frac{1}{\sqrt{K}} \sum_{k=0}^{K-1} A[k] e^{j2\pi \frac{nk}{K}}, \quad (1)$$

$n = -L_{cp}, \ldots, K-1$. We note that the indices $n = -L_{cp}, \ldots, -1$ correspond to the cyclic prefix.

We denote the channel tap with delay l by $h_l$, $0 \le l \le L-1$ where L is maximum discrete-time delay. We assume that $L = L_{cp}$. The values that the taps assume at the sampling times are denoted by $h_l[n]$, i.e., the continuous and the discrete channel taps are related in the following way:

$$h_l[n] = h_l(nT_s) \quad (2)$$

After discarding the cyclic prefix, the receive signal y[n] is given by the formula $$y[n] = \sum_{l=0}^{L-1} h_l[n]x[n-l] + \phi[n], \quad (3)$$

$n = 0, \ldots, K-1.$ where, $\phi[n]$ denotes complex additive noise.

For doubly selective channels, the Basis Expansion Model (BEM) is commonly used to approximate the channel taps, see [2, 3, 4]. Each channel tap $h_l$ is represented as a linear combination of the basis functions. The number of basis functions used is called the model order, and denoted by M. In this application, we study rapidly varying channels, and analyze the channel taps within a single OFDM symbol duration $KT_s$ (excluding the cyclic-prefix time). Consequently, we represent the lth channel tap as $$h_l(t) = \sum_{m=0}^{M-1} b_{lm} B_m(t), \quad (4)$$

$l = 0, \ldots, L-1$, $0 \le t \le KT_s$. We refer to the number $b_{lm}$ as the mth basis coefficient of the lth channel tap.

In the matrix-vector notation, the time domain transmit-receive signal relation shown in Equation (3) can be represented as:

$$y = Hx + \phi \quad (5)$$

where $y := (y[0], \ldots, y[K-1])^T$, is the time domain receive signal, $x := (x[0], \ldots, x[K-1])^T$ is the time domain transmit signal, $\phi := (\phi[0], \ldots, \phi[K-1])^T$ is an additive noise process in the time domain, and H is the time domain channel matrix such that $H[k, k-l] = h_l[k]$.

3. Windowing with Multiple Tapers

In this section, we first develop a mathematical model for equalization with multiple tapers. Next we show how to construct orthogonal tapers. Finally, we discuss improvements due to windowing with multiple tapers.

3.1 Mathematical Model with Multiple Tapers

In [12, 13, 15] a single taper (window) is used to concentrate the frequency domain channel matrix around the diagonal. We consider $\Gamma \ge 1$ orthogonal tapers $w_1, \ldots, w_\Gamma$. The time domain OFDM receive signal y, Equation (3), is multiplied by orthogonal tapers, which gives rise to the following $\Gamma$ tapered receive signals:

$$y_\gamma = w_\gamma y = w_\gamma H x + w_\gamma \phi, \gamma = 1, \ldots, \Gamma, \quad (6)$$

Equivalently, all the tapered receive signals can be written in a matrix form as:

$$\begin{bmatrix} y_1 \\ \vdots \\ y_\Gamma \end{bmatrix} = \begin{bmatrix} D_1 \\ \vdots \\ D_\Gamma \end{bmatrix} y = \begin{bmatrix} D_1 \\ \vdots \\ D_\Gamma \end{bmatrix} (Hx + \phi) \quad (7)$$

where $D_\gamma$ is a diagonal matrix such that $D_\gamma(j,j) = w_\gamma[j]$, and $w_\gamma := [w_\gamma[0], \ldots, w_\gamma[K-1]]^T$. In Section 4, we describe an equalization method with the time domain received signal y and few estimated Fourier coefficients of the channel taps $h_l := (h_l[1], \ldots h_l[K])$ as the only ingredients. In the same section, we formulate two algorithms for the proposed method, one in the time domain, and another one in the frequency domain. The frequency domain algorithm requires less computational effort compared to the time domain algorithm.

3.2 Construction of Orthogonal Tapers

The approach used to obtain a receive-side window in [12, 13] allows one to construct multiple orthogonal tapers. In particular, we show that the optimization problem posed in [12] to obtain the Max Average-S/NR window, can also generate several mutually orthogonal windows. The window proposed in [13] is based on the optimization problem considered in [12].

Following [12], for a fixed integer Q we consider the banded approximation of the frequency domain channel matrix, see more in Sec. IV-A. We introduce the discrete Dirichlet matrix A with the entries:

$$A_{i,j} = \frac{\sin\frac{\pi}{K}(2Q+1)(i-j)}{K\sin\frac{\pi}{K}(i-j)}, \quad (8)$$

and the correlation matrix R with the entries $$R_{i,j} = r_t(i-j)\sum_l \sigma_l^2, \quad (9)$$

where $r_t$ is the tap autocorrelation normalized so that $r_t(0)=1$, and $\sigma_l^2$ is the variance of the lth discrete channel tap, see [12, eqn. (9), (23)] for more details.

The Max Average-SINR window $w_*$, is computed as the eigenvector corresponding to the largest eigenvalue of the following generalized eigenvalue problem:

$$(A \circ R)w_* = \lambda\left(\left(\sigma^2 + \sum_l \sigma_l^2\right)I - A \circ R\right)w_*, \quad (10)$$

where ∘ denotes the Hadamard entry-wise product of matrices, R is the channel correlation matrix, A is the discrete Dirichlet kernel $\sigma^2$ is the variance of the additive noise. We note that the generalized eigenvalue problem (10) is equivalent to the following Hermitian eigenvalue problem:

$$(A \circ R)w_* = \frac{\lambda}{1+\lambda}\left(\sigma^2 + \sum_l \sigma_l^2\right)w_*, \quad (11)$$

In Theorem 1 we prove that the generalized eigenvectors of the generalized eigenvalue problem (10) are orthogonal.

Theorem 1.

The generalized eigenvectors of the generalized eigenvalue problem with the matrices $$(A \circ R) \text{ and } \left(\left(\sigma^2 + \sum_l \sigma_l^2\right)I - A \circ R\right) \text{ being orthogonal}$$

Proof.

The generalized eigenvectors of a generalized eigenvalue problem are orthogonal, if both matrices are Hermitian, and they commute with each other. More precisely, if multiple eigenvalues occur, the corresponding eigenvectors are not uniquely defined, but can be selected mutually orthogonal.

R is the channel correlation matrix, hence it is Hermitian. A is the scaled version of the Dirichlet kernel, hence it is symmetric (Hermitian.) Consequently, $$(A \circ R) \text{ and } \left(\left(\sigma^2 + \sum_l \sigma_l^2\right)I - A \circ R\right)$$

are both Hermitian, and they clearly commute with each other.

Figure 3:
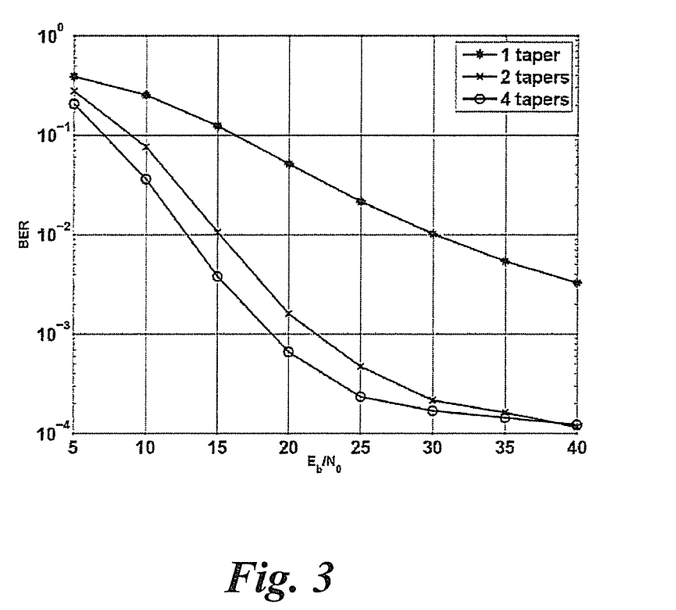
FIGS. 3 and 4 show the bit error rate (BER) as a function of the signal-to-noise-ratio (SNR) expressed as $E_b/N_0$ at a receiver velocity of 300 km/h and 700 km/h, respectively.

We use the first few eigenvectors of the generalized eigenvalue problem [Equation (10)] as orthogonal tapers in the proposed equalization scheme. In FIG. 3, the first four orthogonal tapers are plotted for a typical channel scenario with the Doppler shift of 15% of the intercarrier frequency spacing, and a Jakes Doppler spectrum.

Figure 4:
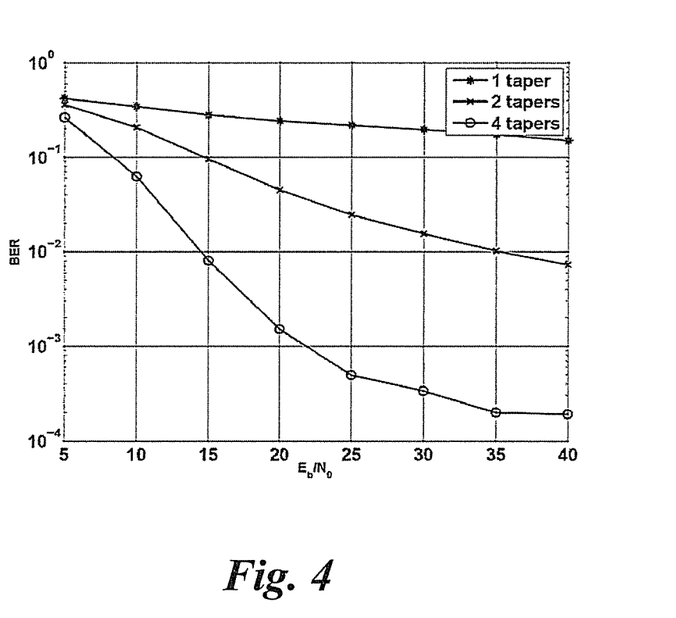

The quality of a taper in terms of its capability to concentrate the frequency domain channel matrix around the diagonal is given by the eigenvalues of the generalized eigenvalue problem posed in Equation (10). In FIG. 4, we plot the first 20 generalized eigenvalues. We note that the first four tapers have very similar capability to concentrate the frequency domain channel matrix. In Section IV, we demonstrate how to use the eigenvalues in order to weight the tapers.

We note that the matrix R is determined by the channel's statistical properties and the Doppler effect. On the other hand, the matrix A depends on the required band approximation of the frequency domain channel matrix. In a practical implementation, a few tapers are pre-computed and stored. Actual tapers depend on the strength of the Doppler effect, and are computed in real time by interpolation.

The window generated by [13] is a solution of a symmetric eigenvalue problem see [13, 4.2.1]. Hence, first few windows generated by [13] corresponding to the largest eigenvalues can also be used as tapers. The algorithm developed for the proposed method in the frequency domain uses these tapers.

Algorithmic details of proposed equalization with multiple orthogonal tapers are provided in Section 4.

3.3 Reducing the Condition Number

Equation (7) shows the linear operators mapping the time domain transmit signal x to the time domain receive signal after applying the taper. The time domain channel matrix H represents a physical phenomenon, hence we cannot change its conditioning. The best that we can do is to estimate it in a stable manner, and regularize properly while equalizing. On the other hand, the properties of the taper matrix $D=[D_1, \ldots, D_\Gamma]^T$ can be controlled as a part of receiver design. In this subsection, we show how the use of multiple tapers ($\Gamma>1$) improves conditioning of the problem compared to using only one taper ($\Gamma=1$).

Theorem 2.

The condition number of the matrix $D=[D_1, \ldots, D_\Gamma]^T$ defined in Equation (7) does not exceed the maximum of the condition numbers of the matrices $D_1, \ldots, D_\Gamma$.

Proof.

The singular values of the matrix D are the square roots of the eigenvalues of the matrix $D^*D$. The matrix $D^*D$ is diagonal with the kth diagonal entry:

$$(D^*D)(k,k) = \sum_{\gamma=1}^{\Gamma} |w_\gamma[k]|^2. \quad (12)$$

Let κ(A) denote the condition number of a matrix A, and let $$\kappa_{max} = \max_{\gamma} \kappa(D_\gamma). \quad (13)$$

For $1 \leq l, k \leq K$, and every $\gamma=1, \ldots, \Gamma$ $$\sum_{\gamma=1}^{\Gamma} |w_\gamma[k]|^2 \leq \sum_{\gamma=1}^{\Gamma} |w_\gamma[l]|^2 \kappa(D_\gamma)^2 \leq \kappa_{max}^2 \sum_{\gamma=1}^{\Gamma} |w_\gamma[l]|^2. \quad (14)$$

Thus the condition number of the matrix D is bounded as follows:

$$\kappa(D) = \frac{\max_k \left\{ \sum_{\gamma=1}^{\Gamma} |w_\gamma[k]|^2 \right\}^{1/2}}{\min_l \left\{ \sum_{\gamma=1}^{\Gamma} |w_\gamma[l]|^2 \right\}^{1/2}} \leq \kappa_{max}. \quad (15)$$

The estimate shown above is the best possible in general, but it is overly pessimistic for several common applications. Conditioning of multiple windows improves dramatically if the windows do not share their zeros, or attain small values simultaneously. This prevents the denominator of the quotient in Eqn. (15) from becoming small, and thus prevents growth of κ(D).

Indeed our numerical experiments show that the condition number the problem using for tapers is ca. 3, while the condition number of the problem using only one taper is ca. 300. Because of additive noise and modeling errors, the receiver signal might have only a few (4-5) correct bits. Therefore reducing the condition number by two orders of magnitude is very significant. In Section 6, we present results of our simulations, which show a noticeable gain in the BER while equalizing with multiple tapers.

4. Equalization Algorithm

In this section, we describe equalization of OFDM signals received over doubly selective channels, which uses multiple orthogonal tapers. The main ingredients for the equalization procedure are the received signal, and the channel state information in terms of the Fourier coefficients of the channel taps (CE-BEM coefficients). A rough estimate of Doppler shift is also required in order to choose the right family of orthogonal tapers.

4.1 Choice of BEM

The most reliable way to estimate a doubly selective channel uses a basis expansion model (BEM). Several suitable bases are known for this purpose, e.g. the Slepian sequences (DPSS-BEM), or complex exponentials (CE-BEM, GCE-BEM). It is known that DPSS-BEM is quite appropriate for modeling of doubly selective channel taps, while the CE-BEM is not [2]. Unfortunately, a banded approximation of the frequency domain channel matrix is equivalent to using CE-BEM, as is demonstrated in this subsection.

Frequency domain channel matrices appearing in this context are banded in the cyclic sense. Specifically, for a fixed positive integers Q and K, we consider K×K matrices with non-zero entries possibly on the main 2Q+1 diagonals wrapped around cyclically. Thus non zero-entries may also appear in Q×Q lower triangular submatrices in the bottom-left corner, or in Q×Q upper triangular submatrices in the top right corner. This structure is considered in [12. FIG. 4].

Theorem 3.

Let H be an arbitrary K×K time-domain channel matrix with the maximum discrete delay L−1, and let B be the (cyclically) banded truncation of the frequency-domain channel matrix $FHF^H$ with the bandwith 2Q+1, $0 \leq Q < K/2$, where F denotes the DFT matrix of size K. The time-domain matrix $E = F^H B F$ is a CE-BEM matrix with the model order 2Q+1, and with the same maximum discrete delay L−1.

Throughout the application, $F^H$ denotes the conjugate transpose of the matrix F.

Proof.

Throughout the proof, arithmetic operations on matrix indices are performed by modulo K. We denote the entries of the matrices H, B and E by $h_{rs}$, $b_{km}$ and $e_{pq}$, respectively. For all indices k and m, $0 \leq k, m \leq K−1$, such that $|m−k| \leq Q$, we have $$b_{km} = \frac{1}{K} \sum_{0 \leq r,s < K} e^{-j2\pi \frac{kr}{K}} h_{rs} e^{j2\pi \frac{sm}{K}}. \quad (16)$$

Setting m=k+d, $|d| \leq Q$ we obtain $$b_{k,k+d} = \frac{1}{K} \sum_{0 \leq r,s < K} e^{-j2\pi \frac{kr}{K}} h_{rs} e^{j2\pi \frac{s(k+d)}{K}} \quad (17)$$

$$= \frac{1}{K} \sum_{0 \leq r,s < K} e^{j2\pi \frac{k(s-r)}{K}} e^{-j2\pi \frac{sd}{K}} h_{rs}.$$

Similarly, for all indices p and q, $0 \leq p, q \leq K−1$, $$e_{pq} = \frac{1}{K} \sum_{\substack{0 \leq k, m < K \\ |m-k| \leq Q}} e^{j2\pi \frac{pk}{K}} b_{km} e^{-j2\pi \frac{mq}{K}} \quad (18)$$

$$= \frac{1}{K} \sum_{\substack{0 \leq k < K \\ |d| \leq Q}} e^{j2\pi \frac{pk}{K}} b_{k,k+d} e^{-j2\pi \frac{(k+d)q}{K}}$$

$$= \frac{1}{K} \sum_{\substack{0 \leq k < K \\ |d| \leq Q}} e^{j2\pi \frac{(p-q)k}{K}} e^{-j2\pi \frac{dq}{K}} b_{k,k+d}.$$

Substituting (17) into (18), we obtain $$e_{pq} = \frac{1}{K^2} \sum_{|d| \leq Q} \sum_{0 \leq k < K} e^{j2\pi \frac{(p-q)k}{K}} e^{-j2\pi \frac{dq}{K}} \sum_{0 \leq r,s < K} e^{j2\pi \frac{k(s-r)}{K}} e^{j2\pi \frac{sd}{K}} h_{rs} \quad (19)$$

$$= \frac{1}{K^2} \sum_{|d| \leq Q} \sum_{0 \leq r,s < K} e^{j2\pi \frac{d(s-q)}{K}} h_{rs} \sum_{0 \leq k < K} e^{j2\pi \frac{(p-q+s-r)k}{K}}$$

$$= \frac{1}{K} \sum_{|d| \leq Q} \sum_{0 \leq s < K} e^{j2\pi \frac{d(s-q)}{K}} h_{s+p-q,s}.$$

From (19), we conclude that the pth entry of the qth channel tap is given by $$e_{p,p-q} = \frac{1}{K} \sum_{|d| \leq Q} \sum_{0 \leq s < K} e^{j2\pi \frac{d(s-p+q)}{K}} h_{s+q,s} \qquad (20)$$

$$= \frac{1}{K} \sum_{|d| \leq Q} e^{-j2\pi \frac{dp}{K}} \sum_{0 \leq s < K} e^{j2\pi \frac{d(s+q)}{K}} h_{s+q,s}$$

$$= \sum_{|d| \leq Q} c_{qd} e^{-j2\pi \frac{dp}{K}},$$

where $$c_{qd} = \frac{1}{K} \sum_{0 \leq s < K} e^{j2\pi \frac{d(s+q)}{K}} h_{s+q,s}. \qquad (21)$$

Formula (20) shows that E is the time-domain matrix of a CE-BEM with the model order 2Q+1.

If $p \geq q+L$, then $h_{s+p-q,s} = 0$ for every s, since the maximum discrete delay of the matrix H is smaller than L. It follows from (19), that also $e_{pq} = 0$. Consequently, the matrix E has the maximum discrete delay smaller than L.

Corollary 1. If additionally, H itself is a CE-BEM matrix with the model order 2Q+1, then E=H, i.e. H is (cyclically) banded in the frequency domain with the bandwith 2Q+1.

Proof. The entries of H have the form $$h_{p,p-q} = \sum_{|d| \leq Q} \tilde{c}_{qd} e^{-j2\pi \frac{dp}{K}}, \qquad (22)$$

where $\hat{c}_{qd}$ are the CE-BEM coefficients of H. Similarly, $$h_{s+q,s} = \sum_{|d'| \leq Q} \tilde{c}_{qd'} e^{-j2\pi \frac{d'(s+q)}{K}}. \qquad (23)$$

Substituting (23) into (21), we obtain $$c_{qd} = \frac{1}{K} \sum_{0 \leq s < K} e^{j2\pi \frac{d(s+q)}{K}} \sum_{|d'| \leq Q} \tilde{c}_{qd'} e^{-j2\pi \frac{d'(s+q)}{K}} \qquad (24)$$

$$= \tilde{c}_{qd} e^{j2\pi \frac{d(s+q)}{K}} e^{-j2\pi \frac{d(s+q)}{K}} = \tilde{c}_{qd}. \qquad (25)$$

The theorem now follows from (20) and (22).

Some articles devoted to OFDM equalization use the DPSS-BEM for channel estimation, followed by approximating the frequency domain channel matrix with a banded matrix, see [3, 15]. Theorem 3 demonstrates that using a sophisticated BEM for channel estimation is ineffective. In its stead, we use only CE-BEM coefficients, and we are aware that the proposed method cannot be improved with by using a more sophisticated basis. An equalization algorithm that applies to an arbitrary BEM is given in [11], however the computational complexity is higher by a factor of ca. 4 compared to the method presented in this work.

4.2 Equalization Algorithm

In this subsection we describe the proposed equalization algorithm. The computational complexity, memory requirements, and other implementation details are provided in the next subsection. The objective of the equalization algorithm is to solve the following least squares problem, that arises after windowing the receive signal with multiple orthogonal tapers:

$$\underset{x}{\operatorname{argmin}} \{ \| \mathcal{D}y - \mathcal{D}Hx \|_2^2 + \alpha^2 \|x\|_2^2 \}, \qquad (26)$$

where $\alpha$ is a regularization parameter, $D=[D_1, \ldots, D_\Gamma]^T$ is defined in Equation (7), and $\|\cdot\|_2$ denotes the Euclidean norm. Since the orthogonal tapers have different concentrations, it is even better to solve a weighted least square problem, where the squared error of each taper is weighted proportionally to its concentration. The weighted least square problem is as follows $$\underset{x}{\operatorname{argmin}} \{ \| \Lambda^{1/2} (\mathcal{D}y - \mathcal{D}Hx) \|_2^2 + \alpha^2 \|x\|_2^2 \}, \qquad (27)$$

Where $\Lambda := (\operatorname{diag}(\lambda_1, \ldots, \lambda_1, \lambda_2 \ldots, \lambda_2, \ldots, \lambda_\Gamma))$, where each $\lambda_\gamma$ appears K times, and $\lambda_\gamma$ is the concentration of the γth orthogonal taper, which is obtained as the generalized eigenvalue of the problem (10). We note, that the matrix $\Lambda$ in Formula (27) can be easily combined with the matrix D as follows:

$$\underset{x}{\operatorname{argmin}} \{ \| \overline{\mathcal{D}}y - \overline{\mathcal{D}}Hx \|_2^2 + \alpha^2 \|x\|_2^2 \}, \qquad (28)$$

here $$\overline{\mathcal{D}} = \Lambda^{\frac{1}{2}} \mathcal{D},$$

which is equivalent to replacing each taper $w_\gamma$ with $\lambda_\gamma w_\gamma$ in Formula (26).

Equivalently, the optimization problem can be solved in the frequency domain to recover the transmit symbol $A := [A[0], \ldots, A[K-1]]$. In the frequency domain, the equivalent problem is posed as:

$$\underset{A}{\operatorname{argmin}} \{ \| \mathcal{F}\overline{\mathcal{D}}y - \mathcal{F}\overline{\mathcal{D}}HF^H A \|_2^2 + \alpha^2 \|A\|_2^2 \}, \qquad (29)$$

where, F denotes a block diagonal matrix with Γ copies of the OFT matrix F along the diagonal. An estimate of A, say Ã, can be obtained by solving the following normal equations corresponding to the least square problem posed in Formula (29):

$$(\alpha^2 I + [\mathcal{F}\overline{\mathcal{D}} HF^H]^H [\mathcal{F}\overline{\mathcal{D}} HF^H]) \tilde{A} = [\mathcal{F}\overline{\mathcal{D}} HF^H]^H \mathcal{F}\overline{\mathcal{D}} y, \qquad (30)$$

equivalently, the above normal equations can be written as:

$$\left( \alpha^2 I + \sum_{\gamma=1}^{\Gamma} [F\overline{\mathcal{D}}_\gamma HF^H]^H [F\mathcal{D}_\gamma HF^H] \right) \tilde{A} = \sum_{\gamma=1}^{\Gamma} [F\mathcal{D}_\gamma HF^H]^H F\overline{\mathcal{D}}_\gamma y, \qquad (31)$$

where $\overline{\mathcal{D}}_\gamma = \lambda_\gamma \mathcal{D}_\gamma$, and, $\overline{\mathcal{D}} = [\overline{\mathcal{D}}_1, \ldots, \overline{\mathcal{D}}_\Gamma]^T$. In order to design a low complexity algorithm, we consider a banded approximation of the γth frequency domain channel matrix, which we call $B_\gamma$. Specifically, $$F\overline{\mathcal{D}}_\gamma HF^H \approx \mathcal{M}_Q \circ [F\overline{\mathcal{D}}_\gamma HF^H] = B_\gamma. \qquad (32)$$

In this equation, $M_Q$ is a matrix with binary entries: with ones in the circular band of width 2Q+1, and zeros elsewhere, see [12. FIG. 4] for the structure. Matrices with binary entries are often referred to as masks. Thus the approximation of the normal equations (31) with the banded frequency domain channel matrix for each taper is as follows:

$$\left(\alpha^2 I + \sum_{\gamma=1}^{\Gamma} B_\gamma^H B_\gamma\right)\tilde{A} = \sum_{\gamma=1}^{\Gamma} B_\gamma^H F \mathcal{D}_\gamma y. \quad (33)$$

$F\mathcal{D}_\gamma y$ is the Fourier transform of the receive signal windowed by the γth taper. Hence, the above equation is equivalently expressed as:

$$\left(\alpha^2 I + \sum_{\gamma=1}^{\Gamma} B_\gamma^H B_\gamma\right)\tilde{A} = \sum_{\gamma=1}^{\Gamma} \sqrt{\gamma_\gamma}\, B_\gamma^H (\hat{w}_\gamma * \hat{y}_\gamma), \quad (34)$$

where, $\hat{w}_\gamma$ and $\hat{y}_\gamma$ are the Fourier transform of the taper $w_\gamma$ and the tapered receive signal $y_\gamma$.

We note that with the banded approximation of the frequency domain channel matrix, Equation (32), the left hand side of the linear system of Equations (31) is banded (circularly) with a bandwidth 4Q+1, and symmetric positive definite. Consequently, the Cholesky factorization of the system matrix can be obtained at a low complexity, and the Cholesky factors are banded as well.

It is easy to see that the proposed method requires O (K log K) flops for equalizing a OFDM symbol with K sub-carriers.

5. Comparison With Other Methods

Low complexity methods for equalization of OFDM signals received over doubly selective channels can be divided into two types. One type of equalizers rely on a banded approximation of the frequency domain channel matrix, in combination with windowing of the receive signal [12, 13, 15]. Another type of equalizer exploits the special structure of the channel matrix modeled by a BEM to accomplish a fast channel matrix vector multiplication, and, consequently equalize using iterative method like LSQR at a low complexity [11]. We note that the method proposed in this application belongs to the former type.

All the methods mentioned above for equalization of OFDM signal received over doubly selective channels required O(K log K) operations. Although, all the methods belong to the same complexity class, the method proposed in [11] requires a factor of 2-4 more operations compared to the method proposed in this application. However, if high accuracy is sought, then the method presented in [11] is the method of choice. This is because, the method presented in [11] does not make any approximation of the channel matrix, and the results are equivalent to those of MMSE equalization. Also [11] is the only algorithm for equalization that can take advantage of a well chosen basis used in BEM.

The method proposed in this application is equivalent to the method used in [13, 15] in case only one taper is used for windowing. However, a significant gain in performance is achieved with the proposed method while using more than one orthogonal taper for windowing. The equalization method proposed in [12] uses stationary iterative methods adapted for the OFDM equalization problem. On the other hand, the method proposed in this application, and the method used in [13, 15] are exact. In [12, 13, 15] some decision feedback mechanism is also suggested. We note that such decision feedback can also be incorporated within the framework of the equalization method presented in this application.

Some works like [3, 15] use a BEM other than CE-BEM to estimate the channel, and further in the step of equalization uses a band a band approximated frequency domain channel matrix. Hence according to Theorem 3, the use of a sophisticated basis in [3, 15] is ineffective. The proposed method uses only CE-BEM and the received signal.

6. Computer Simulations 6.1 Description of Experiments

We simulate an OFDM transmission system complying with the IEEE 802.16e standard [16]. We use K=256 orthogonal subcarriers spaced $f_s$=10.9 kHz apart. The system utilizes a total bandwidth of B=$Kf_s$=2.8 MHz, and requires a sampling time of $T_s$=1/B=0.357 μs. A random bit stream is generated as transmission data. The bits are encoded with a ½ convolution code, interleaved, and mapped to 4QAM symbols. The K=256 subcarriers of each OFDM symbol are modulated with 4QAM data symbols and pilots. The pilot symbols are used for estimation of the Fourier coefficients of the channel taps as described in [5]. The baseband transmit signal is generated by the inverse fast Fourier transform (IFFT). To prevent the ISI, a cyclic prefix of length $L_{cp}$=K/8=32 is used. Thus, the total symbol duration is (K+$L_{cp}$)$T_s$=102.9 μs. The baseband signal is modulated with a carrier frequency of $f_c$=5.8 GHz for transmission.

We pass the transmit signal through a doubly selective, wide sense stationary uncorrelated scattering (WSSUS) channel. The channel is simulated with $L_{cp}$=32 discrete channel taps, which leads to a total delay of 11.4 μs. For illustration, we simulate a channel with two levels of Doppler spread, one with 15% of the intercarrier frequency spacing, and another with 34% of the intercarrier frequency spacing. In our transmission setup. Doppler spreads of 15% and 34% of the intercarrier frequency spacing occur at a receiver velocity of 300 km/h and 700 km/h, respectively. We notice that the same amount of Doppler spread is generated for lower receiver velocities like 100 km/h, and 233 km/h respectively for a system with a carrier frequency of 16.8 GHz. The simulated channel has a Rayleigh fading and a Jakes Doppler spectrum. The channel is simulated using the MATLAB Communication Toolbox (V 3.4), which implements the method of sinusoids [see, W. C. Jakes, Multipath Interference, Microwave Mobile Communications, 1st ed., Wiley-IEEE. May 1994 for details on the method of sinusoids]. The properties of the channel specified above are only meant to serve as an illustration. The proposed equalization method is quite general and does not depend on any statistical properties of the channel. However, the tapers should be selected using a rough estimate of the Doppler shift. After the transmit signal is filtered through the wireless channel, we add an additive white Gaussian noise in terms of energy per data bit (excluding the pilot bits) to the noise spectral density $E_b/N_0$. The proposed equalization method only requires the noise to be additive, and the performance of the method is independent of the distribution of the noise, and depends only on the power of the noise relative to the power of the signal.

At the receiver's end, we process one OFDM symbol at a time. We first discard the cyclic prefix from the receive signal. Next we estimate the Fourier coefficients of the channel taps using the method described in [5]. Next we equalize the receive signal using the proposed method. The required ingredients are the received signal, the Fourier coefficients of the channel taps, and the orthogonal tapers. We also report the bit error rate (BER) averaged over 100,000 OFDM symbols, computed after equalization, discarding pilots, quantization, deinterleaving, and decoding using the BCJR algorithm.

6.2 Discussion of Simulation Results

BER were calculated as functions of $E_b/N_0$. The result obtained using one taper is the same as in reference [12]. A clear performance gain is obtained using while using several tapers, in particular with two, and four tapers.

In our simulations, we have observed that more than four tapers are not required, if the maximum Doppler frequency shift is less than 40% of the intercarrier frequency spacing.

REFERENCES

[1] J. A. C. Bingham, "Multicarrier modulation for data transmission: an idea whose time has come," IEEE Communications Magazine, vol. 28, no. 5, pp. 5-14, May 1990.

[2] T. Zemen and C. F. Mecklenbrauker, "Time-variant channel estimation using discrete prolate spheroidal sequences, ", IEEE Transactions on Signal Processing, vol. 53, no. 9, pp. 3597-3607, September 2005.

[3] Z. Tang, R. C. Cannizzaro, G. Leus, and P Banelli, "Pilot-assisted time-varying channel estimation for OFDM systems," IEEE Trans. Signal Pro-messing, vol. 55, no. 5, pp. 2226-2238, May 2007.

[4] C. Shin, J. G. Andrews, and E. J. Powers, "An efficient design of doubly selective channel estimation for OFDM systems," IEEE Trans. Wireless Communications, vol. 6, no: 10, pp. 3790-3802, October 2007.

[5] T. Hrycak, S. Das, G. Matz, and H. G. Feichtinger, "Practical Estimation of Rapidly Varying Channels in OFDM Systems,", IEEE Transactions on Signal Processing, Vol. 58, No. 11, pp. 5706-5719, November 2010.

[6] H. A. Cirpan and M. K. Tsatsanis, "Maximum likelihood blind channel estimation in the presence of Doppler shifts," IEEE Transactions on Signal Processing [see also IEEE Transactions on Acoustics, Speech, and Signal Processing], vol. 47, no. 6, pp. 1559-1569, June 1999.\

[7] M. Guillaud and D. T. M. Slock, "Channel modeling and associated inter-carrier interference equalization for OFDM systems with high Doppler spread," in Proceedings, 2003 IEEE International Conference on Acoustics, Speech, and Signal Processing, 2003. (ICASSP '03), vol. 4, April 2003, pp. 237-40.

[8] T. Zemen, C. F. Mecklenbrauker, and R. R. Milner, "Time variant channel equalization for MC-CDMA via Fourier basis functions," in MC-SS Workshop 2003, Oberpaffenhofen, Germany, 2003, pp. 451-458.

[9] G. Leus, "On the estimation of rapidly varying channels," in Proc. of the European Signal Processing Conference (EUSIPCO 2004), vol. 4, September 2004, pp. 2227-2230.

[10] D. K. Borah and B. T. Hart, "Frequency-selective fading channel estimation with a polynomial time-varying channel model," IEEE Transactions on Communications, vol. 47, no. 6, pp. 862-873, June 1999.

[11] T. Hrycak, S. Das, G. Matz, and H. G. Feichtinger, "Low Complexity Equalization for Doubly Selective Channels Modeled by a Basis Expansion," IEEE Transactions on Signal Processing, vol. 58, no. 11, pp. 5706-5719, November, 2010.

[12] P Schniter, "Low-complexity equalization of OFDM in doubly selective channels," IEEE Transactions on Signal Processing [see also IEEE Transactions on Acoustics, Speech, and Signal Processing], vol. 52, no. 4, pp. 1002-1011, April 2004.

[13] L. Rugini, P Banelli, and G. Leus, "Low-complexity banded equalizers for OFDM systems in Doppler spread channels,", Journal on Applied Signal Processing, vol. 2006, pp. 1-13, 2006 (Article ID 67404).

[14] D. Thomson, "Spectrum estimation and harmonic analysis," Proceedings of the IEEE, vol. 70, no. 9, pp. 1055-1096, 1982.

[15] K. Fang, L. Rugini, and G. Leus, "Low-complexity Block Turbo Equalization for OFDM Systems in Time-Varying Channels," IEEE Transactions on Signal Processing, vol. 56, no. 11, pp. 5555-5566, November 2008.

[16] Draft IEEE Standard for Local and Metropolitan Area Networks Part 16: Air Interface for Fixed and Mobile Broadband Wireless Access Systems, IEEE Draft Std 802.16e/D7, 2005.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of equalizing an OFDM signal received over a transmission channel defined by a channel matrix, comprising:

windowing the received signal in the time domain with at least two different tapers to obtain at least two tapered received signals;

stacking the tapered received signals in the form of a joint matrix equation $$\begin{bmatrix} y_1 \\ \vdots \\ y_\gamma \\ \vdots \\ y_\Gamma \end{bmatrix} = \begin{bmatrix} D_1 \\ \vdots \\ D_\gamma \\ \vdots \\ D_\Gamma \end{bmatrix} y = \begin{bmatrix} D_1 \\ \vdots \\ D_\gamma \\ \vdots \\ D_\Gamma \end{bmatrix} (Hx + \Phi)$$

with y being the received signal, $\Gamma$ being the number of tapers, $D_\gamma$ being the $\gamma$th taper in form of a diagonal matrix, $y_\gamma$ being the $\gamma$th tapered received signal, H being the channel matrix, x being the time domain transmitted signal, $\phi$ being optional noise; and solving said joint matrix equation for x as a least squares problem;

wherein said joint matrix equation is solved by solving the least squares problem $$\underset{x}{\arg\min}\{\|Dy - DHx\|_2^2\}$$

with

D being the rectangular matrix $[D_1, \ldots, D_\gamma, \ldots, D_\Gamma]^T$.

2. The method of claim 1, wherein all of said tapers are not zero at the same time.

3. The method of claim 1, wherein said tapers are mutually orthogonal.

4. The method of claim 3, wherein said tapers are computed from generalized eigenvectors of the generalized eigenvalue problem with the matrices $$(A \circ R) \text{ and } ((\sigma^2 + \Sigma_1 \sigma_I^2)I - A \circ R)$$

with

A being the discrete Dirichlet matrix,

R being the autocorrelation matrix of the channel matrix, $\sigma^2$ being the variance of the channel noise, and $\sigma_l$ being the power of the lth channel tap.

5. The method of claim 1, wherein said least squares method is applied to an equivalent frequency domain form of said joint matrix equation.

6. The method of claim 5, wherein said equivalent frequency domain form of said joint matrix equation is solved by solving its corresponding normal equations.

7. The method of claim 4, wherein the channel matrix is modeled with a complex-exponential basis expansion model of the channel taps of the transmission channel.

8. The method of claim 7, wherein the channel matrix is modeled with a truncated Fourier series expansion model of the channel taps of the transmission channel.

9. The method of claim 1, wherein in solving the least squares problem the channel matrix is approximated by a banded matrix.

10. The method of claim 9, wherein the least squares problem containing said banded channel matrix approximation is solved by using a Cholesky factorization.

11. The method of claim 1, wherein four tapers are used.

12. A method of equalizing an OFDM signal received over a transmission channel defined by a channel matrix, comprising:

windowing the received signal in the time domain with at least two different tapers to obtain at least two tapered received signals;

stacking the tapered received signals in the form of a joint matrix equation $$\begin{bmatrix} y_1 \\ \vdots \\ y_\gamma \\ \vdots \\ y_\Gamma \end{bmatrix} = \begin{bmatrix} D_1 \\ \vdots \\ D_\gamma \\ \vdots \\ D_\Gamma \end{bmatrix} y = \begin{bmatrix} D_1 \\ \vdots \\ D_\gamma \\ \vdots \\ D_\Gamma \end{bmatrix} (Hx + \Phi)$$

with y being the received signal, $\Gamma$ being the number of tapers, $D_\gamma$ being the $\gamma$th taper in form of a diagonal matrix, $y_\gamma$ being the $\gamma$th tapered received signal, H being the channel matrix, x being the time domain transmitted signal, $\phi$ being optional noise; and solving said joint matrix equation for x as a least squares problem;

wherein said joint matrix equation is solved by solving the regularized least squares problem $$\operatorname*{argmin}_{x} \{\|Dy - DHx\|_2^2 + \alpha^2 \|x\|_2^2\}$$

with

D being the rectangular matrix $[D_1, \ldots, D_\gamma, \ldots, D_\Gamma]^T$, and $\alpha$ being a regularization parameter.

13. The method of claim 12, wherein all of said tapers are not zero at the same time.

14. The method of claim 12, wherein said tapers are mutually orthogonal.

15. The method of claim 12, wherein said least squares method is applied to an equivalent frequency domain form of said joint matrix equation.

16. The method of claim 12, wherein in solving the least squares problem the channel matrix is approximated by a banded matrix.

17. The method of claim 12, wherein four tapers are used.

18. A method of equalizing an OFDM signal received over a transmission channel defined by a channel matrix, comprising:

windowing the received signal in the time domain with at least two different tapers to obtain at least two tapered received signals;

stacking the tapered received signals in the form of a joint matrix equation $$\begin{bmatrix} y_1 \\ \vdots \\ y_\gamma \\ \vdots \\ y_\Gamma \end{bmatrix} = \begin{bmatrix} D_1 \\ \vdots \\ D_\gamma \\ \vdots \\ D_\Gamma \end{bmatrix} y = \begin{bmatrix} D_1 \\ \vdots \\ D_\gamma \\ \vdots \\ D_\Gamma \end{bmatrix} (Hx + \Phi)$$

with y being the received signal, $\Gamma$ being the number of tapers, $D_\gamma$ being the $\gamma$th taper in form of a diagonal matrix, $y_\gamma$ being the $\gamma$th tapered received signal, H being the channel matrix, x being the time domain transmitted signal, $\phi$ being optional noise; and solving said joint matrix equation for x as a least squares problem;

wherein said joint matrix equation is solved by solving the regularized and weighted least squares problem $$\operatorname*{argmin}_{x} \{\|\Lambda^{1/2} \|Dy - DHx\|_2^2 + \alpha^2 \|x\|_2^2\}$$

with

D being the rectangular matrix $[D_1, \ldots, D_\gamma, \ldots, D_\Gamma]^T$, and $\alpha$ being a regularization parameter.

$\Lambda$ being a weighting matrix for the tapers.

19. The method of claim 18, wherein the weighting vector $\Lambda$ is computed as $\Lambda := (\mathrm{diag}(\lambda_1, \ldots, \lambda_1, \lambda_2, \ldots, \lambda_2, \lambda_\Gamma, \ldots, \lambda_\Gamma))$ with $\lambda_\gamma$ being the concentration of the $\gamma$th taper.

20. The method of claim 18, wherein all of said tapers are not zero at the same time.

21. The method of claim 18, wherein said tapers are mutually orthogonal.

22. The method of claim 18, wherein said least squares method is applied to an equivalent frequency domain form of said joint matrix equation.

23. The method of claim 18, wherein in solving the least squares problem the channel matrix is approximated by a banded matrix.

24. The method of claim 18, wherein four tapers are used.

* * * * *